(12) United States Patent
Nonaka et al.

(10) Patent No.: US 6,981,094 B2
(45) Date of Patent: Dec. 27, 2005

(54) STORAGE SYSTEM HAVING A PLURALITY OF INTERFACES

(75) Inventors: Yusuke Nonaka, Yokohama (JP); Naoto Matsunami, Hayama (JP); Ikuya Yagisawa, Tokyo (JP); Akira Nishimoto, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 88 days.

(21) Appl. No.: 10/805,260

(22) Filed: Mar. 22, 2004

(65) Prior Publication Data
US 2005/0172043 A1  Aug. 4, 2005

(30) Foreign Application Priority Data
Jan. 29, 2004 (JP) .............................. 2004-021208

(51) Int. Cl.$^7$ .......................................... G06F 12/00
(52) U.S. Cl. ..................... 711/114; 711/4; 711/112; 711/118; 711/154; 711/202; 711/203; 709/223; 709/226; 709/229; 714/3; 370/235
(58) Field of Search .......................... 711/114, 4, 112, 711/118, 154, 202, 203; 709/223, 226, 229; 714/3; 370/235

(56) References Cited

U.S. PATENT DOCUMENTS

| | | | |
|---|---|---|---|
| 6,606,690 B2 * | 8/2003 | Padovano | 711/148 |
| 6,697,846 B1 | 2/2004 | Soltis | 709/217 |
| 6,757,778 B1 | 6/2004 | van Rietschote | 711/6 |
| 6,769,022 B1 * | 7/2004 | DeKoning et al. | 709/223 |
| 6,810,462 B2 * | 10/2004 | Matsunami et al. | 711/112 |
| 6,850,955 B2 * | 2/2005 | Sonoda et al. | 707/200 |
| 6,868,439 B2 * | 3/2005 | Basu et al. | 709/213 |
| 6,880,052 B2 * | 4/2005 | Lubbers et al. | 711/162 |
| 6,883,065 B1 * | 4/2005 | Pittelkow et al. | 711/114 |
| 2001/0044879 A1 | 11/2001 | Moulton et al. | 711/114 |

(Continued)

FOREIGN PATENT DOCUMENTS

JP    2003-162439    6/2003    .......... G06F 12/00

(Continued)

OTHER PUBLICATIONS

Katsurashima et al., "NAS Switch: A Novel CIFS Server Virtualization," IEEE, pp 82-86, Apr. 2003.*

(Continued)

Primary Examiner—Stephen C. Elmore
(74) Attorney, Agent, or Firm—Mattingly, Stanger, Malur & Brundidge, P.C.

(57) ABSTRACT

A hybrid-type storage system having both SAN and NAS interfaces can be implemented by simple hardware capable of carrying out a SAN function independently of a NAS function and a NAS load. To be more specific, a controller of the storage system comprises a NAS controller for accepting an I/O command issued for a file unit and a SAN controller for accepting an I/O command issued for a block unit. The NAS controller converts an I/O command issued for a file unit into an I/O command issued for a block unit, and transfers the I/O command issued for a block unit to the SAN controller. The SAN controller makes an access to data stored in a disk apparatus in accordance with an I/O command received from the SAN or from the NAS controller as a command issued for a block unit. The NAS and SAN controllers are capable of operating independently of each other.

12 Claims, 11 Drawing Sheets

U.S. PATENT DOCUMENTS

| | | |
|---|---|---|
| 2002/0083120 A1 | 6/2002 | Soltis .......................... 709/200 |
| 2002/0161982 A1 | 10/2002 | Riedel ........................ 711/170 |
| 2002/0178143 A1 * | 11/2002 | Fujimoto ....................... 707/1 |
| 2003/0037061 A1 | 2/2003 | Sastri et al. ............ 707/103 R |
| 2003/0074417 A1 | 4/2003 | Kasako et al. .............. 709/217 |
| 2003/0105767 A1 | 6/2003 | Sonoda et al. .............. 707/100 |
| 2003/0145167 A1 * | 7/2003 | Tomita ....................... 711/114 |
| 2003/0158939 A1 | 8/2003 | Karube ....................... 709/225 |
| 2003/0204671 A1 | 10/2003 | Matsunami et al. ........ 711/112 |
| 2003/0225735 A1 | 12/2003 | Weber ........................... 707/1 |
| 2004/0030668 A1 | 2/2004 | Pawlowski et al. ............ 707/1 |
| 2004/0030822 A1 | 2/2004 | Rajan et al .................... 711/4 |
| 2004/0133718 A1 | 7/2004 | Kodama et al. .............. 710/74 |
| 2004/0139168 A1 | 7/2004 | Tanaka et al. .............. 709/213 |

FOREIGN PATENT DOCUMENTS

| | | | |
|---|---|---|---|
| WO | 2004008322 | 1/2004 | ........... G06F 12/00 |

OTHER PUBLICATIONS

Robinson, "Toward the Age of Smarter Storage," IEEE, pp 35-41, Dec. 2002.*

Wang et al., "A New Scheme of Integrating NAS with SAN," Journal of Shanghai Jiaotong University, vol. E-8, No. 1, p. 6-9, Jun. 2003.*

"Converging SAN and NAS Storage—A Comparison of Unified and Gateway Solutions", Network Appliances, Inc., White Paper, Oct. 2002.

* cited by examiner

STORAGE SYSTEM HAVING A PLURALITY OF INTERFACES

BACKGROUND OF THE INVENTION

The present invention relates to a storage system having a plurality of interfaces. More specifically, the present invention relates to a hybrid-type storage system allowing accesses to data to be made by both a SAN (Storage Area Network)-interface command and a NAS (Network Attached Storage)-interface command.

In recent years, accompanying the growth of the application field of the information system and the progress of the distribution of processing of a computer system, the number of hosts controlled at one site increases substantially. With the number of such hosts increasing, a problem of an increased cost of managing storage systems is raised. In particular, if storage systems of distributed hosts are managed individually, the capacity required by each storage system as a capacity necessary for carrying out operations is difficult to estimate in advance. Thus, if there is a need to increase the capacity, it is necessary to newly install an additional storage system for each individual host. In consequence, the management cost increases.

As technologies for solving the above problem, SAN and NAS techniques are used. It is an object of both the technologies to consolidate storage systems owned individually by distributed hosts. Due to different characteristics of the technologies, however, they are applied to different fields.

The SAN technology is a technology for connecting a plurality of storage systems and a plurality of hosts to each other by using a network dedicated for communications between the hosts and the storage systems in order to implement I/O operations having a high speed and a small latency. In accordance with the SAN technology, an I/O operation between a host and a storage system is carried out in block units. A block is a fixed-length data management unit identified by an address. A block is obtained as a result of dividing the capacity of a storage system into smaller portions each having a predetermined size corresponding to the fixed length. A database is a representative of applications for which the I/O operation carried out in block units is suitable. By consolidating a plurality of database volumes into a single storage system so as to allow their management to be executed in a uniform manner, the management cost of the computer system can be reduced. In addition, the SAN technology provides a dedicated network having high reliability and allows communications to be carried out with a high degree of efficiency. Thus, the SAN technology can also be used as a technique providing an effective communication path for transmitting data in volume units. The transmission of data in volume units is carried out to copy a volume to a remote storage system for the purpose of making a backup for the volume and for the purpose of providing a countermeasure to against accidents on the volume.

On the other hand, the NAS technology is a technique providing a storage system having a file-server function for rendering file services to a plurality of hosts existing in a LAN (Local Area Network). I/O operations between the storage system provided by the NAS technology and the hosts are carried out in file units. In general, a file is identified by using an identifier, which is a character string. A file is a data management unit having a variable length. A representative of applications for which I/O operations carried out in file units are suitable is an application of allowing a plurality of hosts to share a file. By adopting the NAS technology, it is possible to implement a system allowing a plurality of web servers to share a service of the same content and a system allowing a plurality of office PCs to share a text.

As is obvious from the above description, the SAN and the NAS technologies are mutually complementary. These technologies have led to formation of an idea of further reducing the management cost by integration of storage systems conforming to the SAN with the NAS technologies into a single storage system. In accordance with technologies disclosed in non-patent reference 1 and patent reference 1, which are described below, by providing a control program of a storage system as a control program allowing control of both the SAN and the NAS storage systems to be executed, a storage system conforming to both the SAN and the NAS technologies can be implemented. A storage system applying these technologies has SAN and NAS interfaces and allows a storage capacity thereof to be apportioned to the SAN and the NAS interfaces with a high degree of freedom.

It is to be noted that aforementioned patent reference 1 is Japanese Patent Laid-open No. 2003-162439. On the other hand, non-patent reference 1 cited above is a reference authored by Stephen Daniel with a title of "Converging SAN and NAS Storage—A Comparison of Unified and Gateway Solutions," Network Appliance Inc., White Paper, October 2002.

SUMMARY OF THE INVENTION

In accordance with the technology disclosed in non-patent reference 1, it is possible to conform to the SAN and the NAS technologies by using only a single storage system. Since the SAN and the NAS technologies are implemented by using a single control program, however, their functions interfere with each other, raising a problem. It is quite within the bounds of possibility that the SAN function is stopped due to a failure of the NAS function, causing a problem in a failure-proof characteristic. In addition, a maintenance work cannot be carried out by stopping only the NAS function. On the top of that, as the load of the SAN function becomes heavier, the performance of the NAS function deteriorates substantially. Likewise, if the load of the NAS function becomes heavier, on the other hand, the performance of the SAN function deteriorates substantially. Such phenomena make the performance design of the system as a whole difficult. In general, the SAN function serves as the mainstay of the storage system in many cases. Thus, there is a demand for a storage system, which allows operations to make accesses to data stored in a storage system to be continued by using the SAN function even if the NAS function is stopped.

In accordance with the technology disclosed in patent reference 1, on the other hand, the NAS and SAN functions are made more independent of each other so that it is possible to implement a storage system in which the SAN function is not stopped by a failure of the NAS function. Since a plurality of interfaces having the NAS and SAN functions each control a disk apparatus of the storage system, however, hardware that must communicate with an internal network through a shared memory becomes expensive. Thus, it is difficult to apply this technology to a storage system with a small-scale configuration having a small number of interfaces.

It is thus an object of the present invention addressing the problems described above to provide a hybrid-type storage system having both SAN and NAS interfaces as a storage system that can be implemented by simple hardware and is capable of operating as a SAN function without regard to NAS-related factors such as a failure of a NAS function and a NAS load.

The present invention thus provides a storage system allowing accesses to data stored in the storage apparatus thereof to be made through a SAN interface by using an I/O command issued for a block unit and a NAS interface by using an I/O command issued for a file unit. In this storage system, a control unit for controlling the disk apparatus comprises a NAS controller and SAN controller. The NAS controller is a controller for receiving an I/O command issued for a file unit. On the other hand, the SAN controller is a controller for receiving an I/O command issued for a block unit as a command to eventually make an access to data stored in the disk apparatus employed in the storage system.

The NAS controller converts a received I/O command issued for a file unit into an I/O command issued for a block unit and supplies the block-unit I/O command obtained as a result of the command conversion to the SAN controller.

The SAN controller makes an access to data stored in the disk apparatus in accordance with a command received from the SAN interface as an I/O command issued for a block unit or a command received from the NAS controller as a block-unit I/O command resulting from the command conversion.

As a result, the hybrid-type storage system having both SAN and NAS interfaces can be implemented by simple hardware and is capable of operating as a SAN function without regard to NAS-related factors such as a failure of a NAS function and a NAS load.

EMBODIMENTS OF THE INVENTION

Preferred embodiments of the present invention are explained by referring to FIGS. 1 to 11 below. It is to be noted, however, that the scope of the present invention is not limited to these preferred embodiments described as follows.

First Embodiment

A first embodiment of the present invention is explained by referring to FIGS. 1 to 9 as follows.

Figure 1:
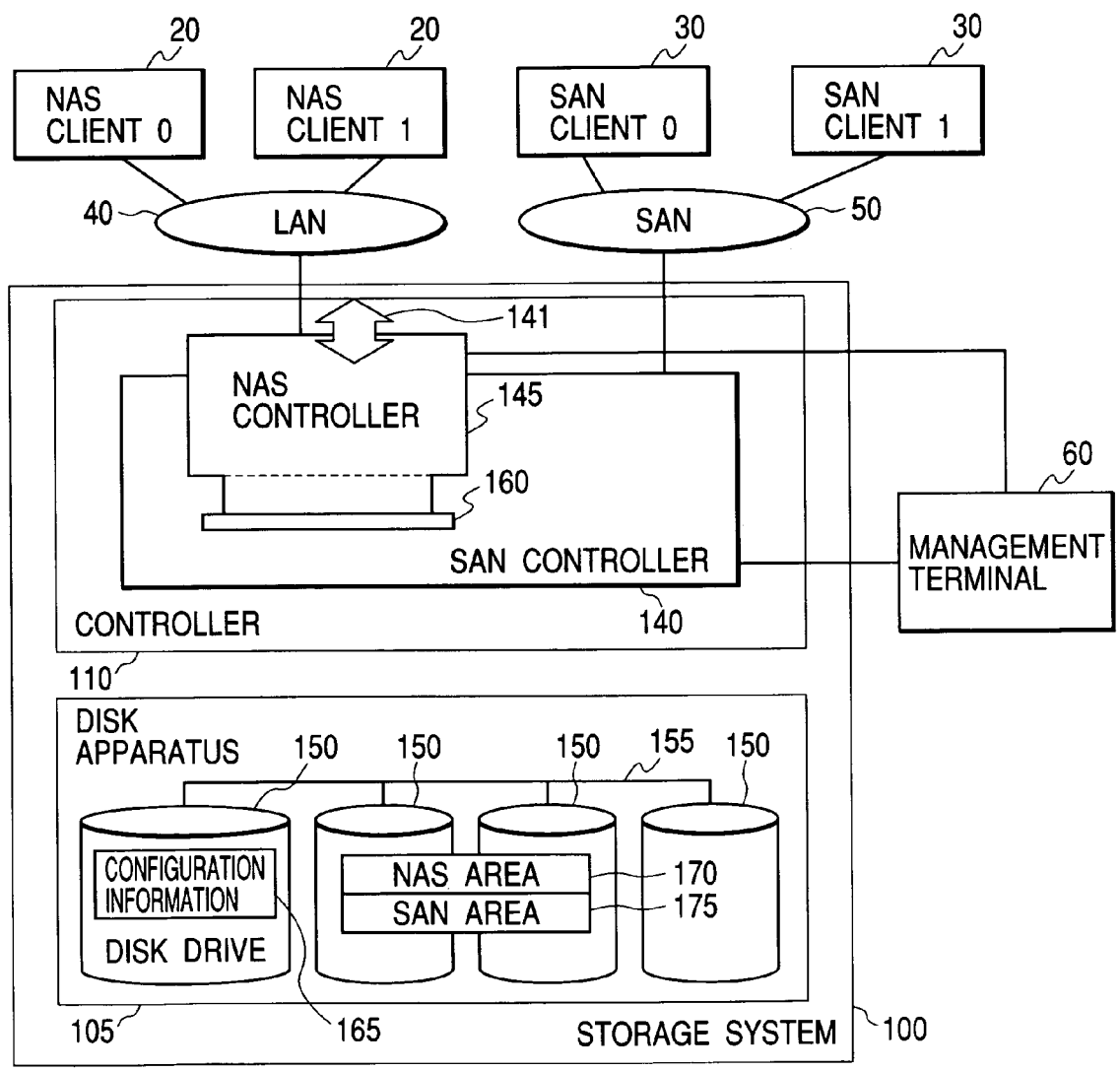
FIG. 1 is a diagram showing the configuration of a computer system employing a storage system implemented by a first embodiment.

First of all, by referring to FIG. 1, the following description explains a typical configuration of a computer system employing a storage system 100 implemented by the first embodiment of the present invention.

The storage system 100 implemented by the first embodiment is connected to a plurality of computers each referred to as a SAN client 30 by a SAN 50 composed of a fibre channel so that the storage system 100 is capable of receiving an I/O command from a SAN client 30. In addition, the storage system 100 is also connected to a plurality of computers each referred to as a NAS client 20 by a LAN 40 so that the storage system 100 is capable of receiving an I/O command from a NAS client 20. Instead of being composed of a fibre channel, the SAN 50 may also be an IP network for which an iSCSI protocol can be used.

The storage system 100 comprises a disk apparatus 105 and a controller 110. The disk apparatus 105 referred also hereafter as a disk array 105 comprises a plurality of disk drives 150 and a communication path 155 for connecting the disk drives 150 to the controller 110.

The controller 110 is capable of inputting and outputting data from and to any of the disk drives 150 through the communication path 155. It is also possible to provide a configuration in which the disk drives 150 and the communication path 155 are included in the controller 110. In addition, the storage system 100 can also have a configuration including a plurality of disk apparatus 105.

A SAN controller 140 is the main configuration component of the controller 110. A NAS controller 145 is implemented as a daughter board mounted on the SAN controller 140. The controller 110 can also have a configuration including two SAN controllers 140 serving as working and spare controllers respectively. This configuration provides redundancy for the purpose of improving reliability. To put it concretely, the spare SAN controller 140 is capable of functioning as a substitute for the working SAN controller 140 to continue the function of the working SAN controller 140 should a failure occur in the working SAN controller 140.

Portions of the storage areas of the disk drives 150 are collected and grouped to form a logical storage area, to which a continuous address space is assigned. Such a logical storage area is referred to as a logical volume. An I/O command issued for a block unit identified by an address in the address space assigned to the logical volume is referred to as a logical block access command. On the other hand, an I/O command issued for a block unit identified by an address in an address space peculiar to a disk drive 150 is referred to as a physical block access command.

The SAN controller 140 is connected to the disk apparatus 105, a management terminal 60 and the SAN 50. The SAN controller 140 has a function to supply a physical block access command to one of disk drives 150 in the disk apparatus 105 in accordance with a logical block access command received from a SAN client 30.

Connected to the LAN 40, the NAS controller 145 can be plugged onto or removed out off a connector 160 provided on the SAN controller 140. The NAS controller 145 has a function to receive an I/O command issued for a file unit from a NAS client 20, convert the I/O command into a logical block access command and supply the logical block access command to the SAN controller 140. An I/O command issued for a file unit is referred to hereafter as a file command.

The SAN controller 140 manages configuration information 165 prescribing a relation between the disk drives 150 and logical volumes. The capability of managing the configuration information 165 allows the disk drives 150 to be allocated as a NAS area 170 and a SAN area 175 with a high degree of freedom. The NAS area 170 is an area that can be used by the NAS controller 145. On the other hand, the SAN area 175 is an area that can be used by a SAN client 30. It is also possible to provide a configuration in which the NAS controller 145 and the SAN controller 140 are implemented as a single board as is the case with a second embodiment to be described later.

Connected to the SAN controller 140 and the NAS controller 145 by using a network such as a LAN, the management terminal 60 comprises a screen, a keyboard and a mouse, which are operated to execute management of the storage system 100. Management operations include activating and stopping the storage system 100, activating and stopping the NAS controller 145, alteration of setting of the storage system 100 including the SAN controller 140 and the NAS controller 145 and reference to information on a failure.

Figure 2:
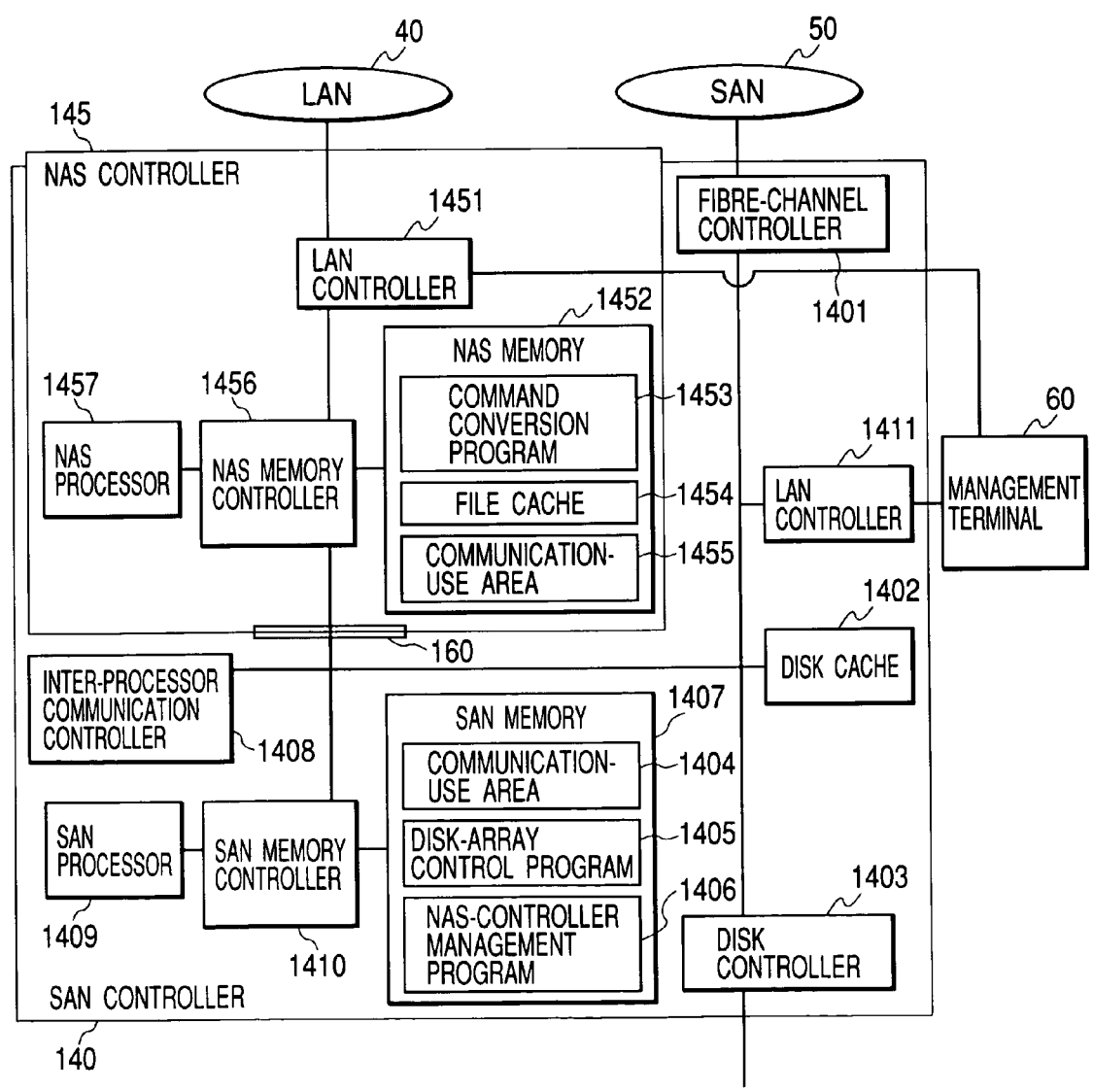
FIG. 2 is a block diagram showing typical configurations of NAS and SAN controllers.

Next, the configurations of the SAN controller 140 and the NAS controller 145 are explained by referring to FIG. 2. FIG. 2 is a block diagram showing typical configurations of the SAN controller 140 and the NAS controller 145.

A SAN processor 1409 on the SAN controller 140 is a processor for mainly interpreting and executing a disk-array control program 1405 and a NAS-controller management program 1406. The SAN processor 1409 uses a SAN memory 1407, which is connected to a SAN memory controller 1410, as a temporary storage device. The disk-array control program 1405 loaded in the SAN memory 1407 has a function to control a disk controller 1403 by decoding a logical block access command received by a fibre-channel controller 1401 and converting the logical block access command into a physical block access command. The disk-array control program 1405 takes advantage of a disk cache 1402 to increase the speed to generate a response to a logical block access command.

On the other hand, the NAS-controller management program 1406 has a function to activate and stop the NAS controller 145 and to refer to information on a failure in accordance with a management operation carried out on the management terminal 60. The disk-array control program 1405 and the NAS-controller management program 1406 are executed by the SAN processor 1409.

A NAS processor 1457 on the NAS controller 145 is a processor for mainly interpreting and executing a command conversion program 1453. The NAS processor 1457 uses a NAS memory 1452, which is connected to a NAS memory controller 1456, as a temporary storage device. The command conversion program 1453 loaded in the NAS memory 1452 has a function to decode a file command received by a LAN controller 1451 and convert the file command into a logical block access command. The command conversion program 1453 supplies the logical block access command obtained as a result of the conversion to the SAN processor 1409.

The disk-array control program 1405 executed by the SAN processor 1409 has a function to convert a logical block access command received from the NAS controller 145 into a physical block access command. This conversion is identical with the process to convert a logical block access command received from a fibre-channel controller 1401 into a physical block access command as described above.

In an operation to transfer a logical block access command from the NAS processor 1457 to the SAN processor 1409, the command conversion program 1453 controls an inter-processor communication controller 1408. To put it in detail, a logical block access command is originally stored in a NAS communication-use area 1455 employed in the NAS controller 145. Controlled by the command conversion program 1453, the inter-processor communication controller 1408 typically carries out a DMA operation to transfer the logical block access command from the NAS communication-use area 1455 to a SAN communication-use area 1404. On the other hand, status indicating a result of the execution of a command is reversely transferred from the SAN communication-use area 1404 to the NAS communication-use area 1455 upon completion of the execution of the command. If the inter-processor communication controller 1408 is provided with an interrupt function for interrupting processes being carried out by the SAN processor 1409 and the NAS processor 1457, completion of a transfer of a command or status can be reported to the SAN processor 1409 and the NAS processor 1457 immediately.

If a file command received from a NAS client 20 is a command making a request to write data into the storage system 100, the data is temporarily stored in a file cache 1454. Then, a logical block access command obtained as a result of a conversion of the file command in accordance with the procedure described above is transferred to the SAN communication-use area 1404. Subsequently, the disk-array control program 1405 transfers the data stored in a file cache 1454 to the disk cache 1402 in accordance with the logical block access command transferred to the SAN communication-use area 1404.

If a file command received from a NAS client 20 is a command making a request to read out data from the storage system 100, on the other hand, a logical block access command obtained as a result of a conversion of the file command in accordance with the procedure described above is transferred to the SAN communication-use area 1404. Subsequently, the disk-array control program 1405 reads out the data from a disk drive 150, storing the data in the disk cache 1402. Finally, the disk-array control program 1405 transfers the data stored in the disk cache 1402 to the file cache 1454 in accordance with the logical block access command transferred to the SAN communication-use area 1404.

A logical block access command and data can be exchanged between the NAS controller 145 and the SAN controller 140 through a bus connected to the connector 160 provided on the SAN controller 140 as a connector used for mounting the NAS controller 145. In addition, the NAS controller 145 can be plugged onto and removed out off the connector 160 while the SAN controller 140 is operating. A PCI bus is a typical bus satisfying such conditions. It is also possible to provide a configuration in which a plurality of NAS controllers 145 is mounted on the SAN controller 140. In such a configuration, as many inter-processor communication controllers 1408 as the NAS controllers 145 are provided on the SAN controller 140 as components for controlling communications between the SAN processor 1409 and the NAS controllers 145. In addition, it is also possible to provide a configuration in which the inter-processor communication controller 1408 is provided on the NAS controller 145.

As described above, the disk-array control program 1405 is a program having a function for converting a logical block access command into a physical block access command. In this case, a logical block access command is an I/O command received by the storage system 100 from a SAN client 30 by way of the SAN 50 as a command issued for a block unit in a logical volume logically defined as a volume logically comprising a plurality of disks in the disk array 105 of the storage system 100. The logical block access command can also be an I/O command received from the NAS controller 145 as a result of converting a file command. On the other hand, a physical block access command is an I/O command issued to a disk included in the logical volume as a disk corresponding to the logical unit.

On the other hand, the command conversion program 1453 is a program having a function for converting an I/O command received by the storage system 100 from a NAS client 20 by way of the LAN 40 as a command issued for a file unit into an I/O command referred to as the logical block access command issued for a block unit to be eventually converted by the disk-array control program 1405 into an aforementioned physical block access command as described above.

The disk-array control program 1405 operates independently of the function of command conversion program 1453. Thus, even if processing carried out by the command conversion program 1453 can no longer be carried out because of a problem of the command conversion program 1453, the processing of the disk-array control program 1405 can be continued to sustain a process carried out for an I/O command received from a SAN client 30.

Thus, a maintenance work can be carried out by stopping only the NAS function. In addition, it is also possible to provide a configuration including a plurality of processors for executing the disk-array control program 1405. By designating only some of the processors as processors for an I/O command transferred from the command conversion program 1453, the SAN performance can be sustained at at least a predetermined level even if the NAS load becomes heavier. Likewise, even if the SAN load reversely becomes heavier, the NAS performance can be sustained at at least a predetermined level.

The command conversion program 1453 and the disk-array control program 1405 for controlling the disk apparatus 105 communicate with each other through an internal bus, requiring neither internal network nor shared memory. Thus, this configuration can be implemented at a low cost.

By referring to FIGS. 3 to 9, the following description explains control operations carried out by the storage system 100 implemented by the first embodiment of the present invention.

Figure 3:
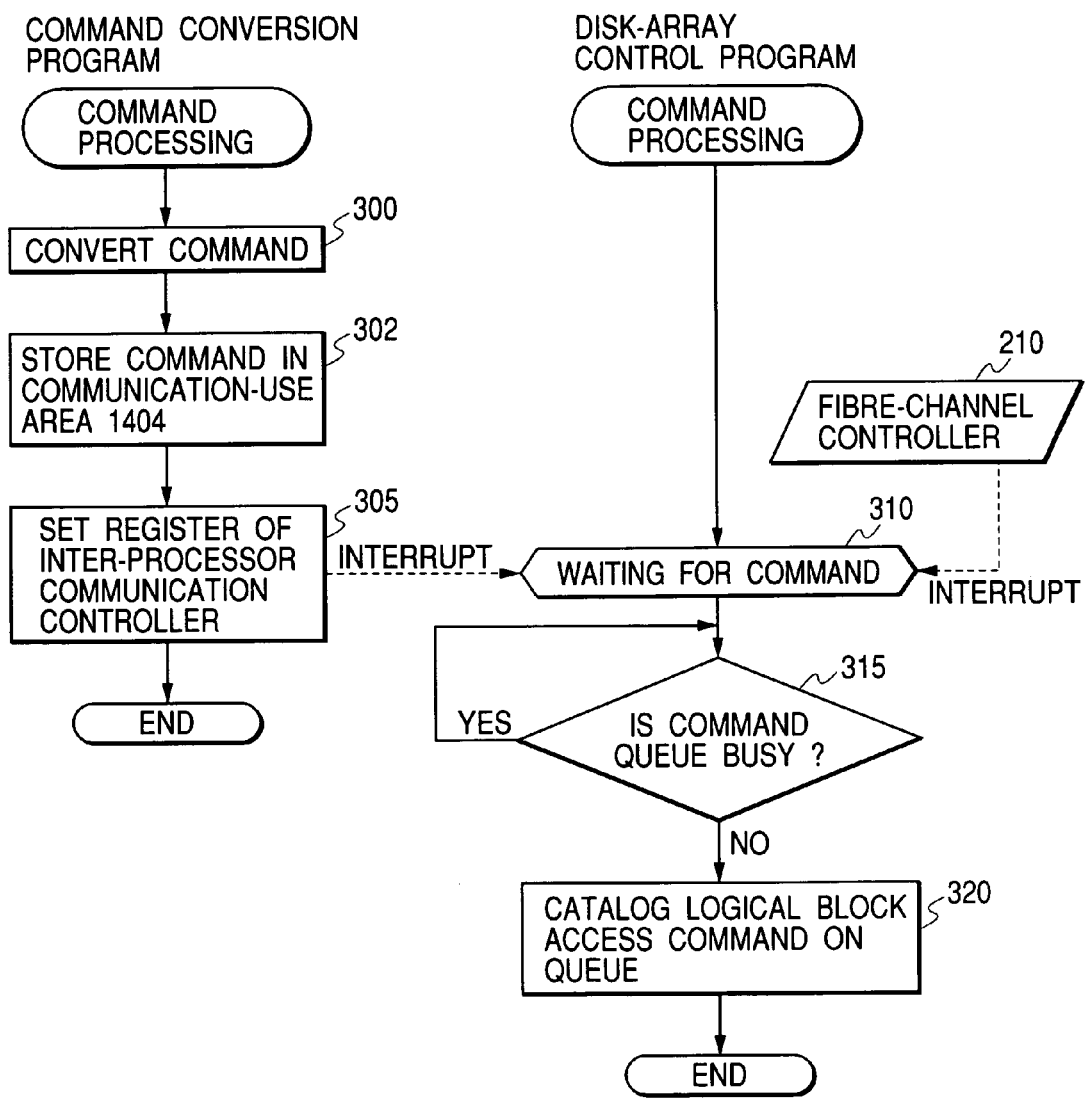
FIG. 3 shows a flowchart representing a typical command conversion process.

With reference to a flowchart shown in FIG. 3, the description begins with an explanation of processing operations, which are carried out by the disk-array control program 1405 included in the configuration shown in FIG. 2 to catalog a command received from the command conversion program 1453 also included in the configuration shown in FIG. 2 or a command received from the fibre-channel controller 1401 on a command queue.

FIG. 3 shows a flowchart representing a typical flow of a command from the command conversion program 1453 or the fibre-channel controller 1401 to the command queue as a flow including a command conversion process. At a step 300, the command conversion program 1453 converts a file command into a logical block access command. Then, at the next step 302, the command conversion program 1453 transfers the logical block access command to the SAN communication-use area 1404. Subsequently, at the next step 305, a bit of a register of the inter-processor communication controller 1408 is set to generate an interrupt. In the mean time, the disk-array control program 1405 is in state of waiting for a logical block access command at a step 310. Interrupted by the inter-processor communication controller 1408, the disk-array control program 1405 executes a step 315 to determine whether or not the command queue is busy. If the command queue is not busy, the flow continues to a step 320 to transfer the logical block access command from the SAN communication-use area 1404 to the command queue. If the command queue is busy, on the other hand, the disk-array control program 1405 remains in the waiting state till the command queue becomes no longer busy. The command queue is busy because a logical block access command received by the fibre-channel controller 1401 is being transferred to the command queue following an interrupt output by the fibre-channel controller 1401 to the SAN processor 1409 or a logical block access command stored in the SAN communication-use area 1404 is being transferred to the command queue as described above. Thus, the determination process of the step 315 is a kind of exclusion control to prevent a logical block access command stored in the SAN communication-use area 1404 from being transferred by the command conversion program 1453 to the command queue while a logical block access command is being transferred from the fibre-channel controller 1401 to the queue, and prevent a logical block access command received by the fibre-channel controller 1401 from being transferred to the command queue while a logical block access command is being transferred by the command conversion program 1453 from the SAN communication-use area 1404 to the queue. The exclusion control is typically implemented by assigning an equal priority level to interrupts output by the inter-processor communication controller 1408 and the fibre-channel controller 1401 to the SAN processor 1409 and carrying out the operation to transfer a logical block access command from the SAN communication-use area 1404 or the fibre-channel controller 1401 to the command queue as a process for handling an interrupt.

Figure 4:
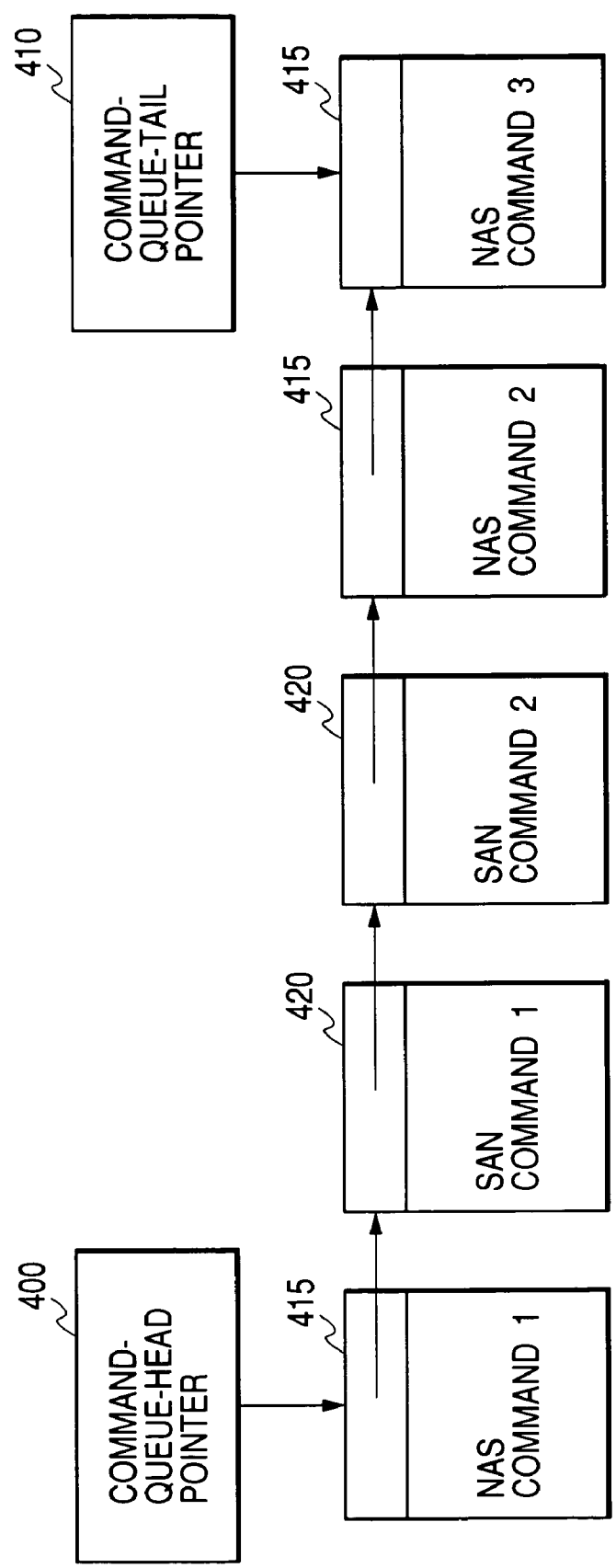
FIG. 4 is a diagram showing a typical data structure of a command queue.
Figure 5:
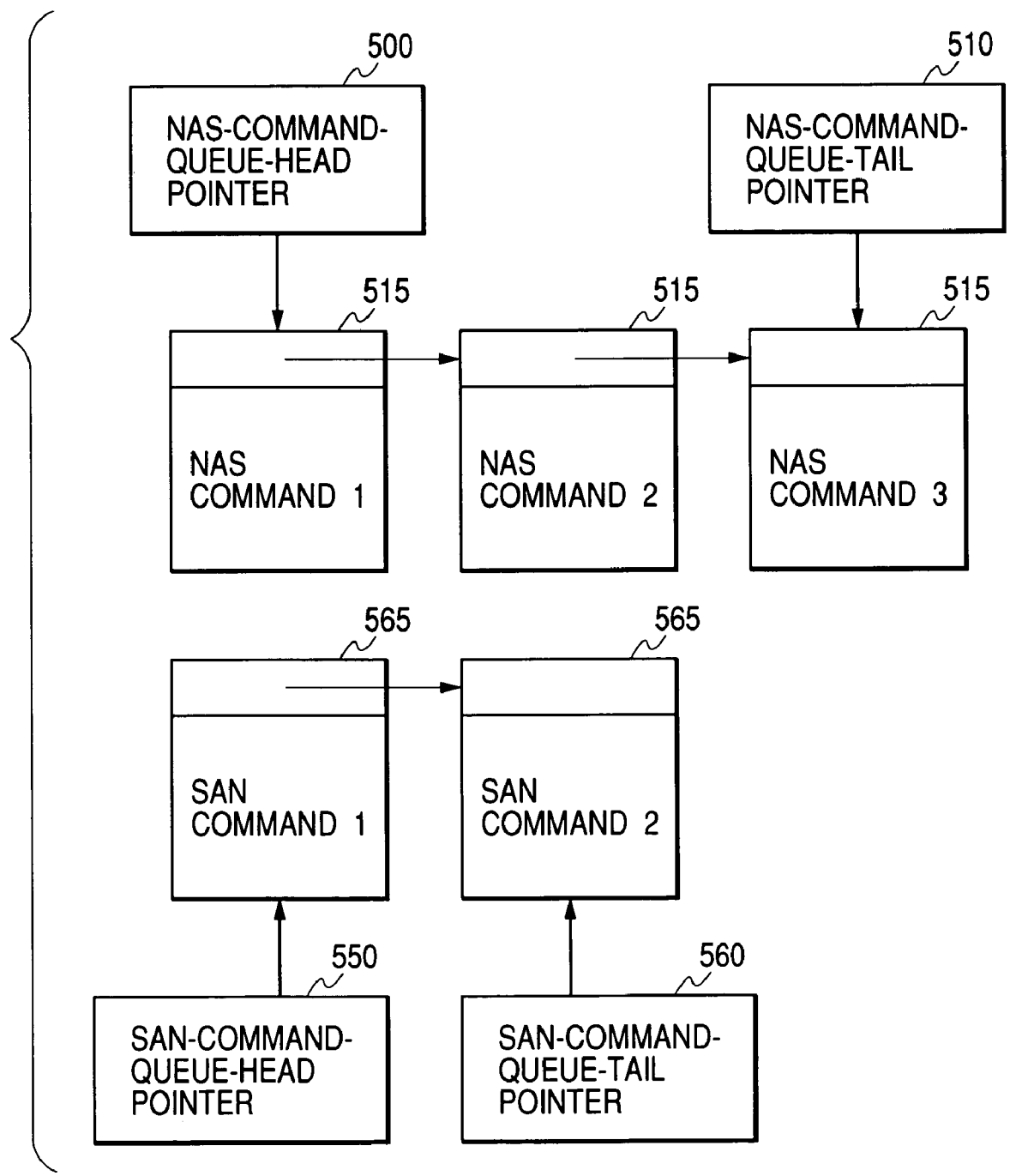
FIG. 5 is a diagram showing another typical data structure of the command queue.

Typical data structures of the command queue are explained by referring to FIGS. 4 and 5. FIGS. 4 and 5 are diagrams each showing a typical data structure of the command queue.

The command-queue data structures shown in the diagrams each include both logical block access commands transferred from the SAN communication-use area 1404 and logical block access commands transferred from the fibre-channel controller 1401. As described earlier, the logical block access commands transferred from the SAN communication-use area 1404 are each a result of a command conversion process carried out by the command conversion program 1453 included in the configuration shown in FIG. 2.

In the typical data structure shown in FIG. 4, a command-queue-head pointer 400 points to the address of a logical block access command to be executed next. On the other hand, a command-queue-tail pointer 410 points to the address of a logical block access command newly added to the tail of the command queue. In the data structure, NAS commands 415 are each a logical block access command transferred from the SAN communication-use area 1404 as a result of a command conversion process carried out by the command conversion program 1453 while SAN commands 420 coexisting with the NAS commands 415 are each a logical block access command transferred from the fibre-channel controller 1401. The logical block access commands cataloged on the command queue are processed sequentially on a FIFO (First In First Out) basis.

It is to be noted that the command queue is stored in the SAN memory 1407 included in the configuration shown in FIG. 2.

The typical data structure shown in FIG. 5 is different from the typical data structure shown in FIG. 4 in that, in the case of the data structure shown in FIG. 5, the logical block access commands are cataloged in separate queues, i. e., a NAS queue used for cataloging NAS commands 515 and a SAN queue used for cataloging SAN commands 565.

A logical block access command stored in the SAN communication-use area 1404 as a result of a command conversion process carried out by the command conversion program 1453 is transferred to a NAS-queue location pointed to by a NAS command-queue-tail pointer 510. On the other hand, a logical block access command received from the fibre-channel controller 1401 is transferred to a SAN-queue location pointed to by a SAN command-queue-tail pointer 560.

The command-queue data structure shown in FIG. 5 is characterized in that control can be executed to determine whether processing of a NAS command takes precedence of processing of a SAN command, or the processing of a SAN command takes precedence of the processing of a NAS command. That is to say, in order to process an I/O request made by a NAS client 20 shown in FIG. 1, taking precedence of an I/O request made by a SAN client 30 shown in the same figure, a NAS command pointed to by a NAS command-queue-head pointer 500 is executed first. In order to process an I/O request made by a SAN client 30 by taking precedence of an I/O request made by a NAS client 20, on the other hand, a SAN command pointed to by a SAN command-queue-head pointer 550 is executed first.

Figure 6:
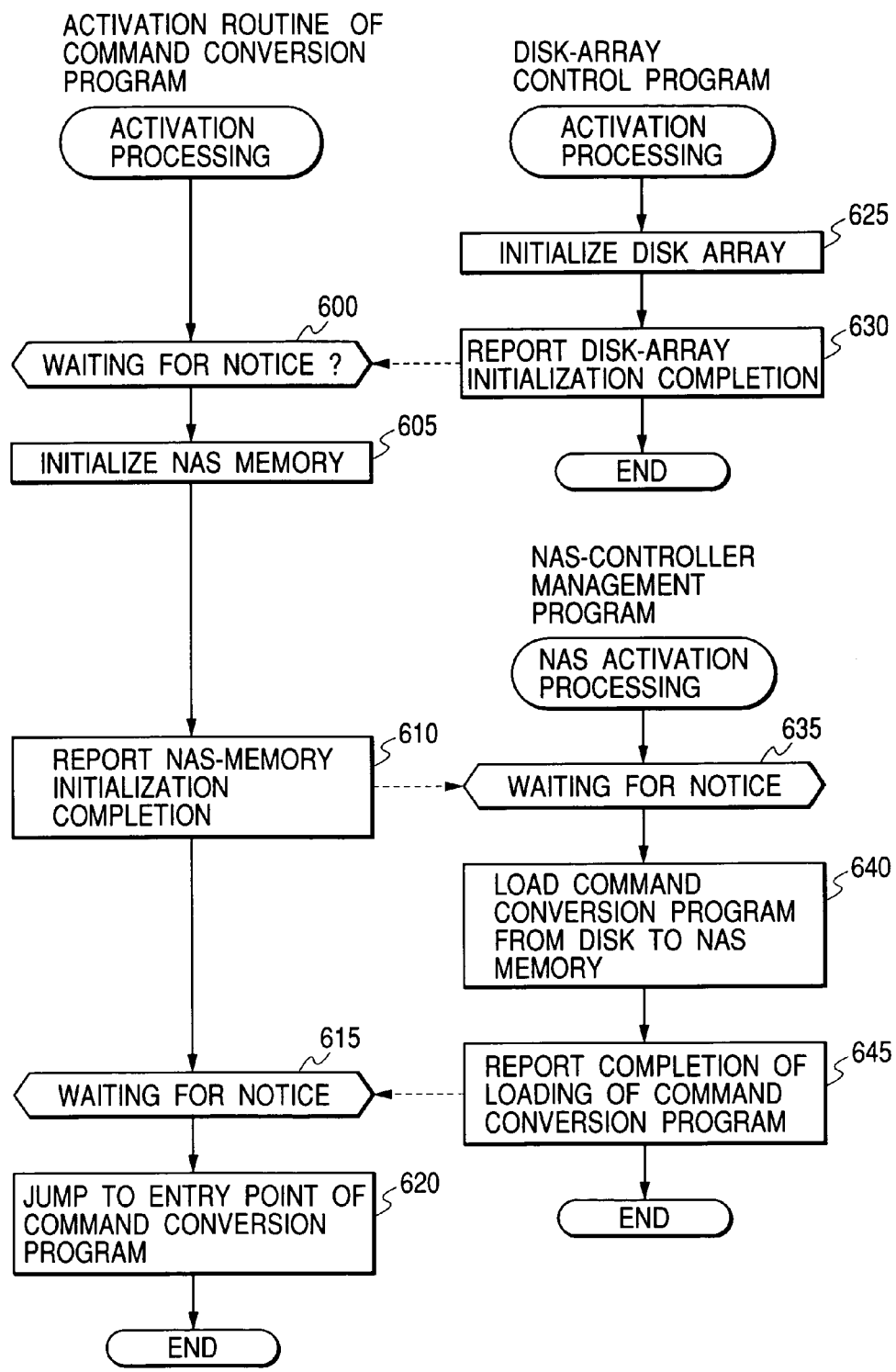
FIG. 6 shows flowcharts representing typical processes carried out at the activation of a command conversion program, a disk-array control program and a NAS-controller management program, which are provided by the first embodiment.

By referring to flowcharts shown in FIG. 6, the following description explains processing of the activation of the command conversion program 1453, the disk-array control program 1405 and the NAS-controller management program 1406 which are provided by the first embodiment. FIG. 6 shows flowcharts representing typical processes carried out at the activation of the command conversion program 1453, the disk-array control program 1405 and the NAS-controller management program 1406.

When the power supply of the storage system 100 shown in FIG. 1 is turned on, the SAN controller 140 and the NAS controller 145 are initialized. After the SAN controller 140 is initialized, an IPL loads the disk-array control program 1405 and the NAS-controller management program 1406 from a disk drive 150 into the SAN memory 1407 included in the configuration shown in FIG. 2. Then, the SAN processor 1409 starts executing the disk-array control program 1405 and the NAS-controller management program 1406. The NAS-controller management program 1406 enters a wait state at a step 635.

After the NAS controller 145 is initialized, an IPL loads an activation routine of the command conversion program 1453 from a ROM mounted on the NAS controller 145. Since the command conversion program 1453 was installed in a disk drive 150, this IPL cannot load the command conversion program 1453 because the IPL cannot make an access to any disk drive 150. For this reason, the IPL loads the activation routine of the command conversion program 1453 first. The activation routine enters a state of waiting for a notice indicating completion of an initialization of the disk array 105 at a step 600.

In the mean time, the started disk-array control program 1405 initializes the disk array 105 at a step 625. After, the initialization of the disk array 105 is completed, the disk-array control program 1405 transmits a notice indicating the completion of the initialization of the disk array 105 to the activation routine at the next step 630.

Receiving the notice indicating the completion of the initialization of the disk array 105, the activation routine initializes the NAS memory 1452 at a step 605.

Then, at the next step 610, the activation routine informs the NAS-controller management program 1406 that the NAS memory 1452 has been initialized. Subsequently, at the next step 615, the activation routine enters a state of waiting for a notice to be given by the NAS-controller management program 1406. Informed of the fact that the NAS memory 1452 has been initialized at the step 635, the NAS-controller management program 1406 loads the command conversion program 1453 from a disk drive 150 into the NAS memory 1452 at a step 640 by using a means such as the DMA technique.

At the next step 645, the NAS-controller management program 1406 notifies the activation routine of the command conversion program 1453 that the operation to load the command conversion program 1453 has been completed.

Notified of the fact that the operation to load the command conversion program 1453 has been completed at the step 615, the activation routine of the command conversion program 1453 executes a jump to the entry point of the command conversion program 1453 at the next step 620. In this way, the execution of the command conversion program 1453 is started.

Figure 7:
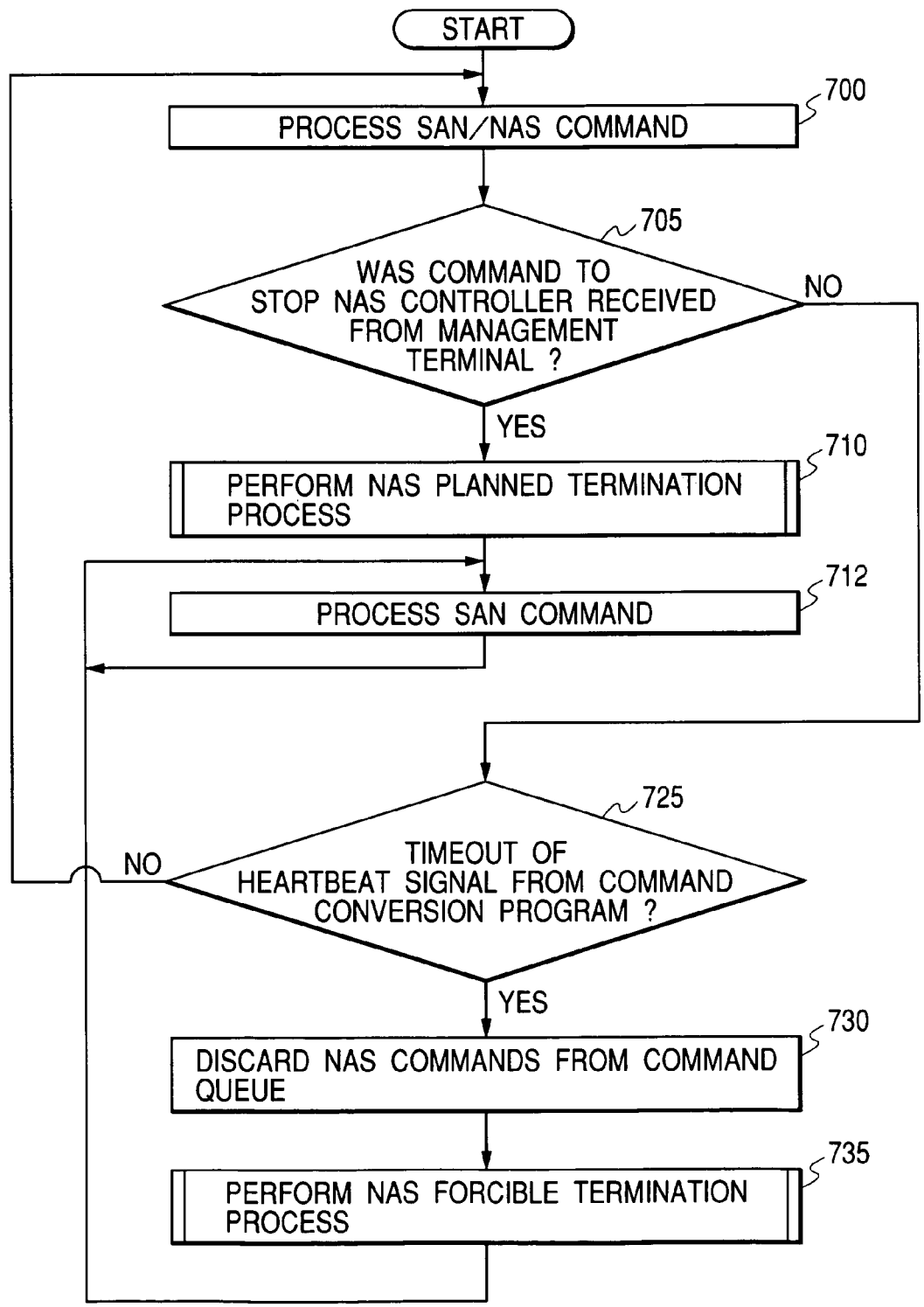
FIG. 7 shows a flowchart representing a typical process, which is carried out when the disk-array control program stops a NAS controller.
Figure 8:
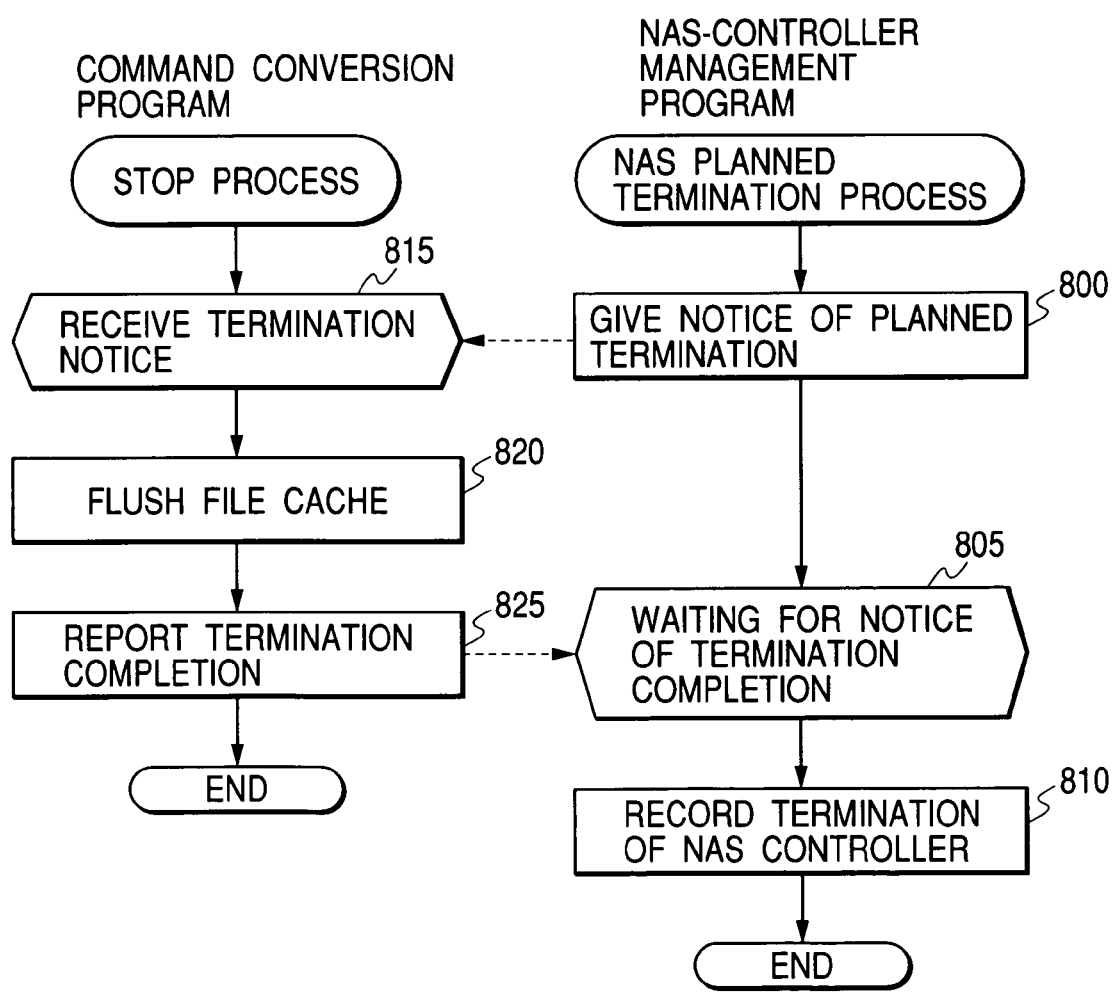
FIG. 8 shows flowcharts representing a typical process of a NAS planned termination subroutine called from the process represented by the subroutine shown in FIG. 7.
Figure 9:
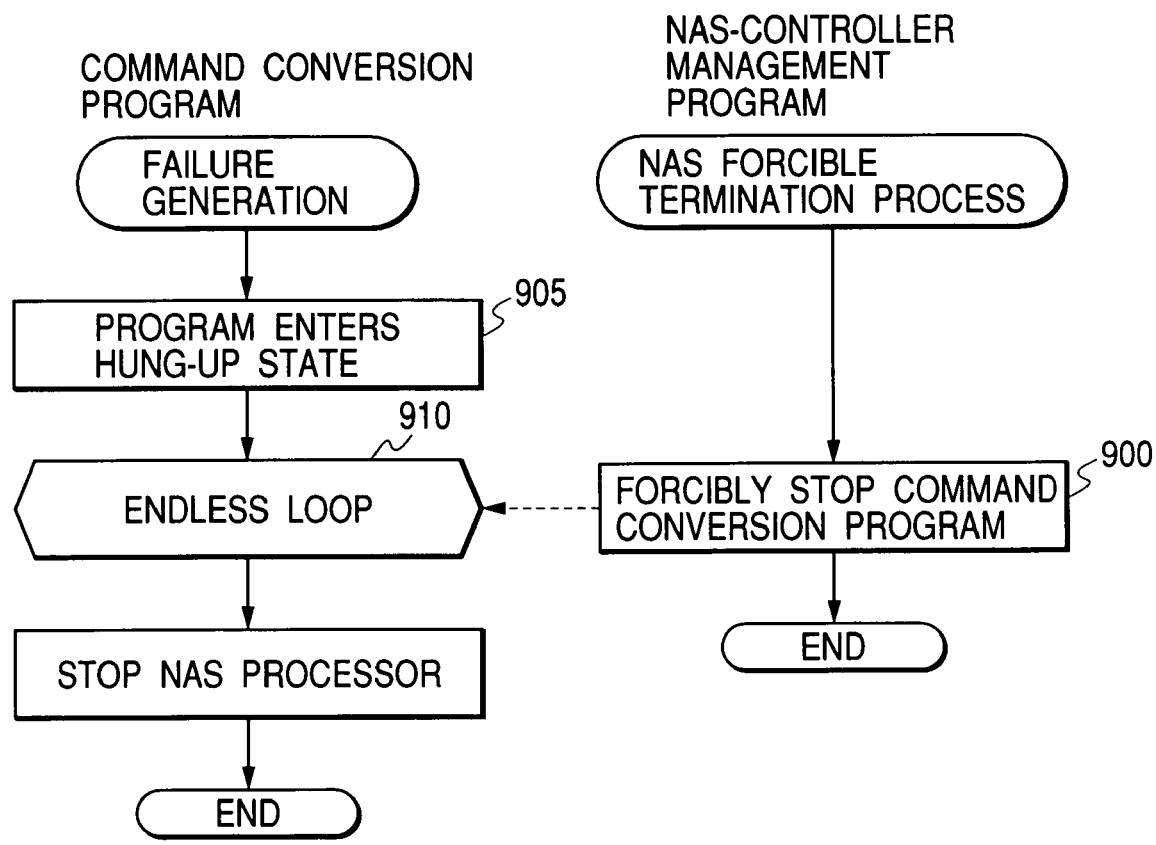
FIG. 9 shows flowcharts representing a typical process of a NAS forcible termination subroutine called from the process represented by the subroutine shown in FIG. 7.

By referring to flowcharts shown in FIGS. 7 to 9, the following description explains processing carried out by the disk-array control program 1405 to stop the NAS controller 145. FIG. 7 shows a flowchart representing a typical process, which is carried out when the disk-array control program 1405 stops the NAS controller 145. FIG. 8 shows flowcharts representing a typical process of a NAS planned termination subroutine called from the process represented by the subroutine shown in FIG. 7. FIG. 9 shows flowcharts representing a typical process of a NAS forcible termination subroutine called from the process represented by the subroutine shown in FIG. 7.

At a step 705 of the flowchart shown in FIG. 7, a stop command to halt the NAS controller 145 is received from the management terminal 60 while the disk-array control program 1405 is processing a SAN or NAS command at a step 700. In this case, the flow of the process goes on to a step 710 at which a NAS planned termination process is carried out. Details of the NAS planned termination process will be explained later.

If no command to stop the NAS controller 145 is received from the management terminal 60 at the step 705, on the other hand, the flow of the process goes on to a step 725 to determine whether or not a timeout of a heartbeat signal received from the command conversion program 1453 at predetermined intervals has occurred. The occurrence of such a timeout can be interpreted as detection of an abnormality of the NAS controller 145. If an abnormality has been detected, the flow of the process goes on to a step 730 at which NAS commands are discarded from the command queue. Then, at the next step 735, a NAS forcible termination process is carried out. Details of the NAS forcible termination process will also be explained later. After the execution of the NAS planned termination process or the NAS forcible termination process is completed, the flow of the process goes on to a step 712 to transit to a SAN operation mode of processing only SAN commands.

When the operation of the NAS controller 145 is resumed in accordance with a resume command received from the management terminal 60, the storage system 100 transits to a SAN/NAS operation mode beginning at the step 700 at which the disk-array control program 1405 processes a SAN or NAS command. The NAS controller 145 can be resumed by having the disk-array control program 1405 return control to the step 630 of the flowchart shown in FIG. 6.

At a step 800 of the NAS planned termination process represented by the flowcharts shown in FIG. 8, the NAS-controller management program 1406 gives a notice of a planned termination to the command conversion program 1453. After receiving the notice of a planned termination at a step 815, the command conversion program 1453 transfers written data stored in the file cache 1454 to a disk cache 1402 at the next step 820. Then, at the next step 825, the command conversion program 1453 gives a notice of completion of the planned termination to the NAS-controller management program 1406.

After receiving the notice of completion of the planned termination at a step 805, the NAS-controller management program 1406 records the termination of the NAS controller 145 at the next step 810. Thereafter, the NAS controller 145 is not monitored anymore.

At a step 905 of the NAS forcible termination process represented by the flowcharts shown in FIG. 9, the command conversion program 1453 is put in a hung-up state caused by a generated failure, entering an endless loop at the next step 910. In this endless loop, the command conversion program 1453 is not capable of carrying out communications at all. In the mean time, the NAS-controller management program 1406 gives a notice of a forcible termination of the command conversion program 1453 to the NAS processor 1457 by using a hardware means such as a termination signal at a step 900. The notice of a forcible termination of the command conversion program 1453 causes the NAS controller 145 to enter a state in which the SAN controller 140 is not affected and data is not destroyed even if the power supply of the NAS controller 145 is cut off. Thus, a repair work such as replacement of the NAS controller 145 can be carried out.

This embodiment has a configuration in which the operation of the SAN controller 140 serving as hardware with the SAN function is not dependent on the operation of the NAS controller 145 serving as hardware with the NAS function. Thus, the operation of the SAN function can be continued in the event of a failure of the NAS function without being affected by the failure. Examples of the failure of the NAS function include a hardware failure of the NAS controller 145 and a software failure of the command conversion program 1453. In addition, a maintenance work can be carried out by carrying out a planned termination of the NAS function, which can be resumed later after the work. That is to say, the disk-array control program 1405 executed by the SAN processor 1409 mounted on the SAN controller 140 is capable of operating to accept an I/O command received from the SAN 50 as a command issued for a block unit. The disk-array control program 1405 is capable of processing such an I/O command independently of the existence of a logical block access command received from the NAS controller 145. As described earlier, the logical block access command received from the NAS controller 145 is a command obtained as a result of a conversion process of an I/O command, which is received by the NAS controller 145 as a command issued for a file unit.

In addition, since neither an internal network nor a shared memory is required for communications between the NAS controller 145 and the SAN controller 140, the storage system 100 can be implemented at a low hardware cost. Furthermore, since the NAS controller 145 does not require a processor for executing the disk-array control program 1405, the NAS controller 145 can also be implemented at a low hardware cost as well.

On the top of that, by separating the queue used for cataloging NAS commands 515 from the queue used for cataloging SAN commands 565 as shown in FIG. 5, a NAS command 515 can be processed, taking precedence of SAN commands 565, or a SAN command 565 can be processed, taking precedence of NAS commands 515.

Moreover, it is also possible to provide a configuration including 2 or more pairs of the SAN processor 1409 and the SAN memory 1407, which are shown in the configuration of FIG. 2, on the same SAN controller 140. In such a configuration, a SAN processor 1409 for processing a NAS queue for managing NAS commands 515 can be provided separately from a SAN processor 1409 for processing a SAN queue for managing SAN commands 565 and, in addition, the queue used for cataloging NAS commands 515 and the queue used for cataloging SAN commands 565 can be stored in different SAN memories 1407. In this configuration, a processing system processes I/O requests made by a NAS client 20 independently of processing carried out by another processing system to process I/O requests made by a SAN client 30. Thus, even if the load borne by a particular one of the processing systems becomes heavier, the performance of the other processing system can be assured without being affected by the particular processing system. As a result, the performance of the system as a whole can be contemplated with ease.

Second Embodiment

A second embodiment of the present invention is explained below by referring to FIGS. 10 and 11. First of all, the second embodiment of the present invention is explained by referring to FIG. 10 as follows.

Figure 10:
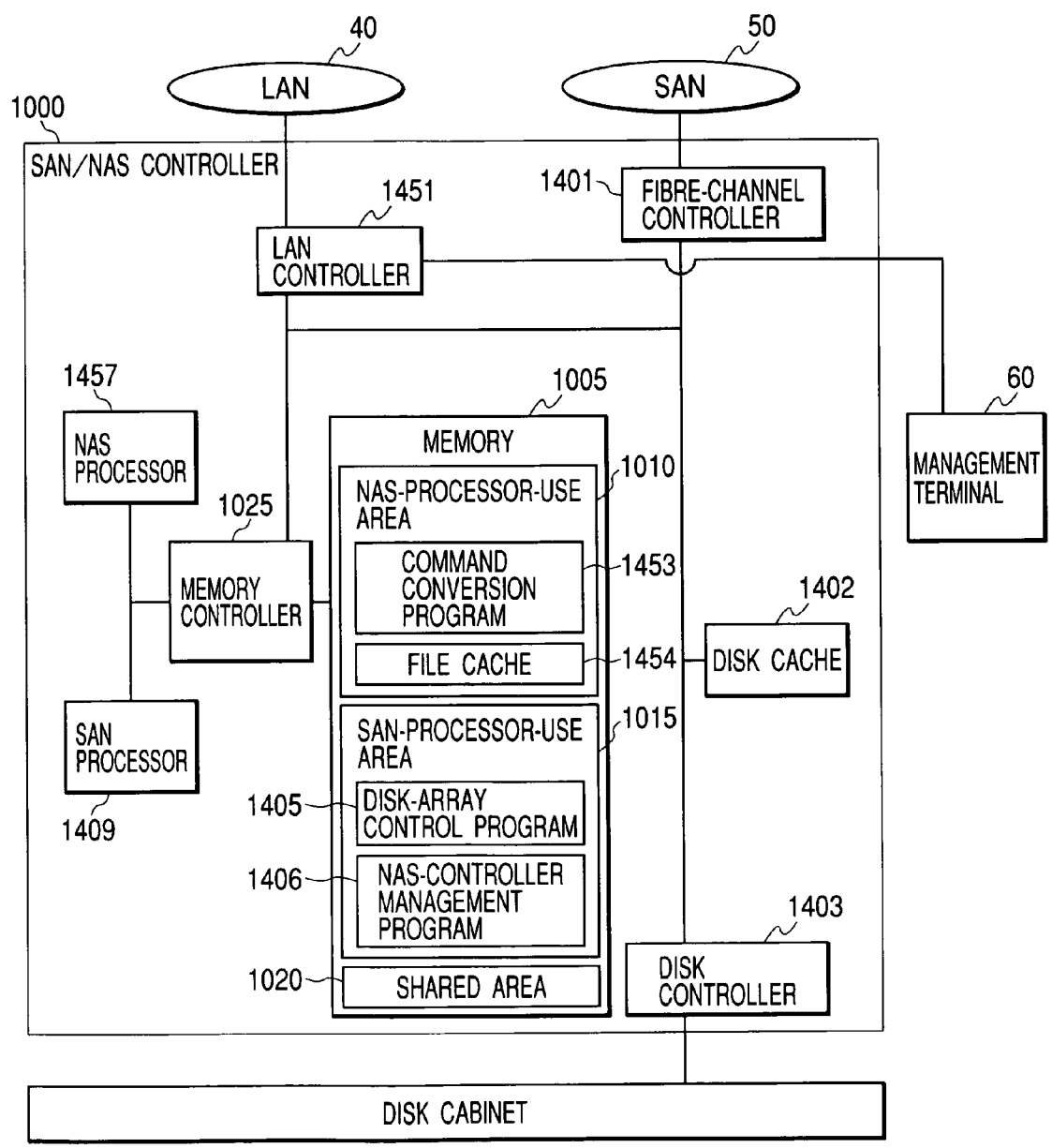
FIG. 10 is a block diagram showing a typical configuration of SAN/NAS controllers.

FIG. 10 is a block diagram showing a typical configuration of SAN/NAS controllers. The second embodiment is obtained by replacing portions corresponding to the SAN controller 140 and NAS controller 145 of the first embodiment shown in FIG. 1 with a SAN/NAS controller 1000 shown in FIG. 10.

Interfaces of the SAN/NAS controller 1000 with the LAN 40, the SAN 50, the management terminal 60 and the disk apparatus 105 are the same as the interfaces of the SAN controller 140 and the NAS controller 145. The second embodiment is different from the first embodiment in that, in the case of the second embodiment, the SAN processor 1409 and the NAS processor 1457 share a memory controller 1025 and a memory 1005. The memory 1005 is divided into a NAS-processor-use area 1010 and a SAN-processor-use area 1015.

Executed by the NAS processor 1457, the command conversion program 1453 has a function to interpret a file command received by the LAN controller 1451 and convert the file command into a logical block access command. The command conversion program 1453 supplies the logical block access command resulting from the conversion to the SAN processor 1409. The command conversion program 1453 executed by the NAS processor 1457 supplies the resulting logical block access command to the SAN processor 1409 by way of a shared memory 1020, which is used by the SAN processor 1409 and the NAS processor 1457 to exchange data with each other. The disk-array control program 1405 recognizes a logical block access command supplied by the SAN processor 1409 by polling or a processor interrupt, and converts the logical block access command into a physical block access command in the same way as the first embodiment.

Devices provided on the SAN/NAS controller 1000 as devices other than the memory controller 1025 and the memory 1005 are not shared by the SAN processor 1409 and the NAS processor 1457. To be more specific, the SAN processor 1409 exclusively uses the fibre-channel controller 1401, the disk cache 1402 and the disk controller 1403. On the other hand, the NAS processor 1457 exclusively uses the LAN controller 1451. A route in an interrupt controller embedded in the memory controller 1025 is set to apply interrupts generated by devices exclusively used by the SAN processor 1409 to the SAN processor 1409 and interrupts generated by devices exclusively used by the NAS processor 1457 to the NAS processor 1457.

Figure 11:
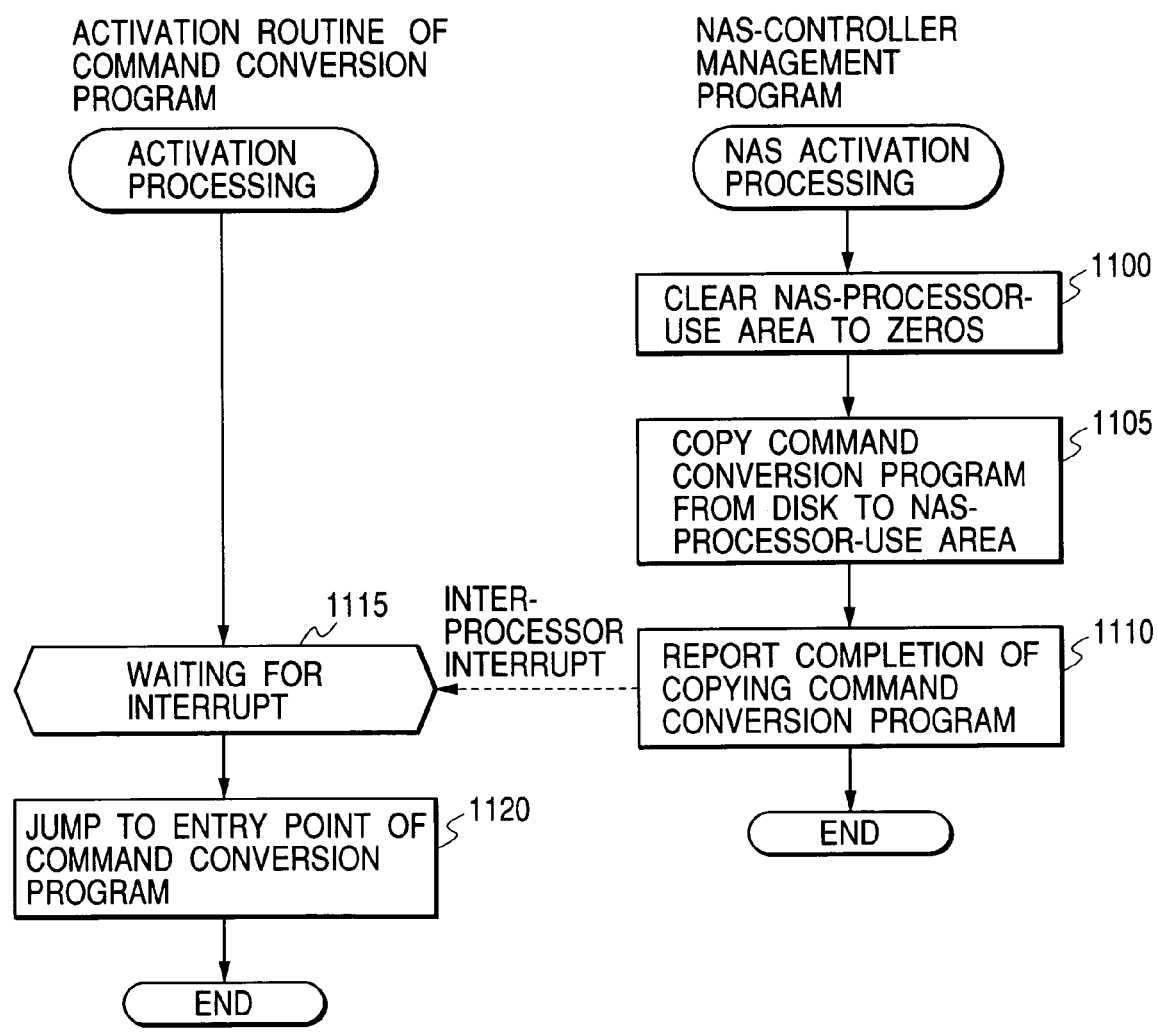
FIG. 11 shows flowcharts representing typical processes carried out at the activation of a command conversion program and a disk-array control program, which are provided by a second embodiment.

By referring to flowcharts shown in FIG. 11, the following description explains activation processes of the command conversion program 1453 and the disk-array control program 1405, which are executed in the second embodiment of the present invention.

FIG. 11 shows the flowcharts representing typical processes carried out at the activation of the command conversion program 1453 and a disk-array control program 1405, which are provided by the second embodiment of the present invention.

In this embodiment, since the SAN processor 1409 and the NAS processor 1457 share the memory controller 1025, it is impossible to activate and stop only the command conversion program 1453 by using a hardware means. Thus, before the command conversion program 1453 is activated or reactivated, first of all, the NAS-controller management program 1406 clears the contents of the NAS-processor-use area 1010 to all zeros at a step 1100. Then, at the next step 1105, the NAS-controller management program 1406 copies data stored in a disk used by the command conversion program 1453 to the NAS-processor-use area 1010. Subsequently, at the next step 1110, by using an interrupt, the NAS-controller management program 1406 informs the NAS processor 1457 that the copy process has been completed.

In the mean time, at a step 1115, the NAS processor 1457 is in a state of waiting for an other-system activation command processor interrupt, which is peculiar to a multi-processor system. Receiving such an interrupt, the NAS processor 1457 executes a jump to the entry point of the command conversion program 1453 at the next step 1120 to start the execution of the program.

The second embodiment employs fewer components than the first embodiment so that the storage system 100 provided by the second embodiment can be implemented at a lower cost. The first embodiment employs two or more sets of a memory controller and its peripheral circuit. On the other hand, the second embodiment can live with only one set of a memory controller and its peripheral circuit. In addition, in the case of the second embodiment, the shared memory 1020 shared by the NAS processor 1457 and the SAN processor 1409 is used for inter-processor communications. Thus, the hardware such as the inter-processor communication controller 1408 of the configuration shown in FIG. 2 is not required. In the case of the second embodiment, however, the NAS-use hardware cannot be replaced while the SAN/NAS controller 1000 is operating without affecting the operation of the SAN function.

What is claimed is:

1. A storage system comprising:
a disk array including a plurality of disks; and
a controller coupled to the plurality of disks;
wherein:
the controller comprises a SAN controller and a NAS controller coupled to the SAN controller;
the NAS controller includes a NAS processor, which is configured to convert a file I/O command received from a NAS client computer into a block I/O command and transfer the block I/O command to the SAN controller, and a NAS memory for storing a command conversion program executed by the NAS processor to convert the file I/O command into the block I/O command,
the SAN controller includes a SAN processor, which is configured to access data stored in the plurality of disks according to a block I/O command received from a SAN client computer or the block I/O command received from the NAS processor, and a SAN memory for storing a disk-array control program executed by the SAN processor to access data stored in the plurality of disks according to the block I/O command and a NAS controller management program executed by the SAN processor to control the NAS controller;
wherein:
after the SAN controller is initialized, the disk array is arranged to be initialized by the execution of the disk-array control program and the SAN processor is arranged to transmit a completion notice of the initialization of the disk array to the NAS controller,
after reception of the completion notice of the initialization of the disk array, the NAS controller is arranged to initialize the NAS memory and to transmit a completion notice of the initialization of the NAS memory to the SAN controller,
after reception of the completion notice of the initialization of the NAS memory, the SAN controller is arranged to transmit the command conversion program stored in the disk array to the NAS memory by executing the NAS controller management program and to transmit a completion notice of the program transmission, and
after reception of the completion notice of the program transmission, the NAS controller is arranged to start execution of the command conversion program.

2. A storage system according to claim 1, wherein the NAS controller and the SAN controller are connected via a bus, and the NAS controller is configured to communicate with the SAN controller via the bus.

3. A storage system according to claim 1, wherein the SAN processor is configured to continue the execution of the disk-array control program to access data stored in the plurality of disks according to the block I/O command received from the SAN client computer, when the execution of the command conversion program stops.

4. A storage system according to claim 1, wherein the SAN memory for the SAN controller is arranged to receive the disk-array controller management program and the NAS control program from the plurality of disks after the initialization of the SAN controller and before initialization of the disk array.

5. A storage system according to claim 1, wherein the SAN controller is arranged to terminate the execution of the command conversion program by giving a notice from the NAS controller management program to the command conversion program in response to a termination signal, the command conversion program being arranged to store data from a file cache of the NAS controller to a disk cache of the SAN controller in response to the notice prior to the termination of the command conversion program.

6. A storage system according to claim 1,
wherein, when the command conversion program enters a hung-up state due to a failure of the NAS controller, the SAN controller is arranged to terminate the executing of the command conversion program by giving a forcible termination notice from the NAS controller management program to the NAS processor.

7. A method of operating a storage system, having a disk array including a plurality of disks and a controller coupled to the plurality of disks, the method comprising:
  initializing a SAN controller of the controller;
  initializing the disk array by execution of a disk-array control program stored in a SAN memory of the SAN controller;
  transmitting a completion notice of the initialization of the disk array from the SAN controller to a NAS controller of the controller;
  initializing a NAS memory of the NAS controller after reception of the completion notice of the initialization of the disk array;
  transmitting a completion notice of the initialization of the NAS memory to the SAN controller;
  transmitting a command conversion program stored in a disk in the disk array from the SAN controller to the NAS controller to be stored in the NAS controller, after reception of the completion notice of the initialization of the NAS memory by the SAN controller, by executing a NAS controller management program stored in the SAN memory;
  transmitting a completion notice of the transmission of the command conversion program;
  converting by the NAS processor a file I/O command received from a NAS client computer into a block I/O command using the command conversion program stored in the NAS controller;
  transferring the block I/O command to the SAN controller; and
  accessing data stored in the plurality of disks according to the block I/O command, the SAN processor also being arranged to access data stored in the plurality of disks according to a block I/O command received from a SAN client computer.

8. A method according to claim 7, wherein the NAS controller communicates with the SAN controller via a bus connecting the NAS and SAN controllers.

9. A method according to claim 7, wherein the SAN processor continues the execution of the disk-array control program to access the data stored in the plurality of disks according to the block I/O command received from the SAN client computer, when the execution of the command conversion program stops.

10. A method according to claim 7, wherein the SAN memory of the SAN controller receives the disk-array controller management program and the NAS control program from the plurality of disks after the initialization of the SAN controller and before initialization of the disk array.

11. A method according to claim 7, wherein the SAN controller terminates the execution of the command conversion program by giving a notice from the NAS controller management program to the command conversion program in response to a termination signal, the command conversion program storing data from a file cache of the NAS controller to a disk cache of the SAN controller in response to the notice prior to the termination of the command conversion program.

12. A method according to claim 7, wherein, when the command conversion program enters a hung-up state due to a failure of the NAS controller, the SAN controller terminates the execution of the command conversion program by giving a forcible termination notice from the NAS controller management program to the NAS processor.

* * * * *